United States Patent [19]

Nishimura et al.

[11] 4,386,306

[45] May 31, 1983

[54] NUMERICAL CONTROL DEVICE

[75] Inventors: Hideo Nishimura, Aichi; Minoru Enomoto, Ohbu, both of Japan

[73] Assignee: Toyoda Koki Kabushiki Kaisha, Kariya, Japan

[21] Appl. No.: 204,716

[22] Filed: Nov. 6, 1980

[30] Foreign Application Priority Data

Nov. 26, 1979 [JP] Japan .................. 54-152641

[51] Int. Cl.³ ........................................ G05B 19/24
[52] U.S. Cl. ................................... 318/571; 318/601; 364/474
[58] Field of Search .................. 318/561, 571, 601; 364/474

[56] References Cited

U.S. PATENT DOCUMENTS

| 3,716,950 | 2/1973 | McClure | 51/206 NF |
| 3,949,286 | 4/1976 | Appelgren | 318/571 |
| 4,023,084 | 5/1977 | Owa | 318/571 X |
| 4,085,890 | 4/1978 | Kimura | 318/571 X |
| 4,266,375 | 5/1981 | Nishimura | 318/571 X |
| 4,330,832 | 5/1982 | Kohzai et al. | 318/571 X |

Primary Examiner—B. Dobeck
Attorney, Agent, or Firm—Oblon, Fisher, Spivak, McClelland & Maier

[57] ABSTRACT

A numerical control device for controlling rotation of a servomotor in response to numerical control data to move a movable member by a commanded feed amount at a commanded feed rate. A velocity detector detects an actual feed rate of the movable member. A register stores an allowable feed rate data. A comparator compares an allowable feed rate data from the register and an actual feed rate from the velocity detector to output an abnormal signal when the actual feed rate exceeds the allowable feed rate. The allowable feed rate data is set into the register each time the commanded feed rate is changed.

13 Claims, 6 Drawing Figures

NUMERICAL CONTROL DEVICE

BACKGROUND OF THE INVENTION

1. Field of the Invention

The present invention relates to numerical control device for controlling the movement of a movable member in accordance with numerical control data.

2. Description of the Prior Art

A numerical control device can control movement of a movable member with high accuracy. However, if a pulse distributing circuit or a servomotor drive circuit in the numerical control device fails to properly operate, the movable member may move at an overspeed. Accordingly, in such a case, it is not only impossible to properly position the movable member, but also a tool on the movable member could be brought into engagement with a workpiece at a rapid feed rate, resulting in breakage of the tool, fault of the workpiece and the like.

In order to avoid this, abnormality of a servo-mechanism has been conventionally detected to immediately stop movement of the movable member by checking whether a content of a differential counter exceeds a predetermined amount. This predetermined amount has been set to be relatively larger so as not to generate an abnormal signal at a normal rapid feed rate of the movable member. Accordingly, even if the movable member initiates to move at an overspeed during its feed movement, the abnormal signal cannot be immediately generated. It was therefore difficult to perfectly avoid engagement of the tool with the workpiece at the overspeed.

SUMMARY OF THE INVENTION

It is an object of the present invention to provide an improved numerical control device capable of immediately stopping movement of a movable member when the movable member initiates to move at an overspeed.

Another object of the present invention is to provide an improved numerical control device wherein allowable feed rate data of the movable member is set each time commanded feed rate data is changed.

Briefly, according to the present invention, these and other objects are achieved by providing a numerical control device for controlling rotation of a servomotor connected through a feed screw shaft to a movable member in response to numerical control data to move the movable member by a commanded feed amount at a commanded feed rate, as mentioned below. A velocity detector is provided for detecting an actual feed rate of the movable member. A register is provided for storing an allowable feed rate data. A comparator is provided for comparing an allowable feed rate data from the register and an actual feed rate from the velocity detector to output an abnormal signal when the actual feed rate exceeds the allowable feed rate. An operating and processing device is further provided for setting an allowable feed rate data into the register each time commanded feed rate data is changed.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENTS

Figure 1:
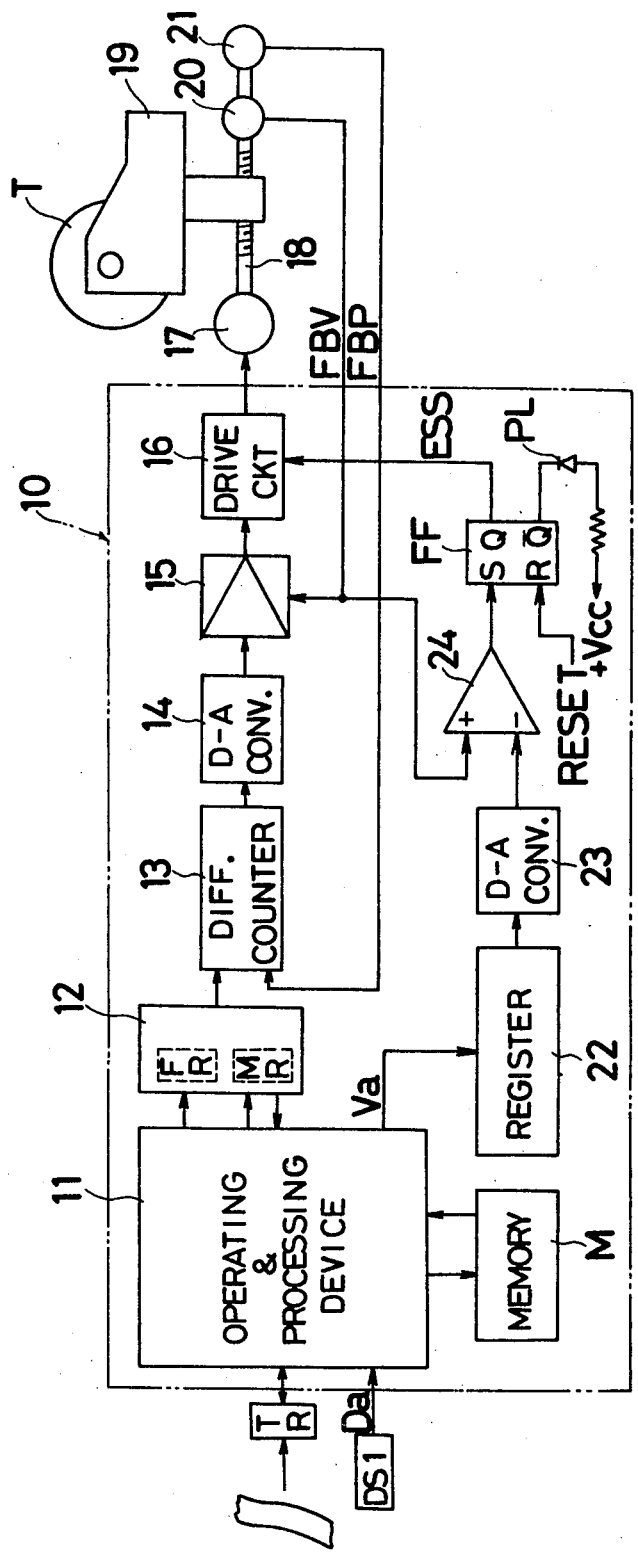
FIG. 1 is a block diagram of a first embodiment of a numerical control device according to the present invention for controlling movement of a movable member.

Referring now to the drawings, wherein like reference numerals or characters refer to identical or corresponding parts throughout the several views, and more particularly to FIG. 1, there is shown a numerical control device generally indicated at 10 which includes an operation and processing device 11 such as a microcomputer to which a pulse generating circuit 12 is connected to receive therefrom commanded feed rate data and commanded feed amount data in a feed rate register FR and a feed amount register MR, respectively. When receiving commanded feed rate data and feed amount data from the operation and processing device 11, the pulse generating circuit 12 distributes to a differential counter 13 a train of pulses whose frequency corresponds to the commanded feed rate data in the register FR. The differential counter 13 calculates the difference in number between the distributed pulses and feedback pulses generated from a pulse generator 21, which is described later. It is to be noted herein that such calculated difference indicates a value proportional to the frequency of the distributed pulses, namely to the commanded feed rate. The difference calculated by the differential counter 13 is applied to a digital to analog converter 14 to be converted into a corresponding analog signal, which is then applied as a velocity command voltage to a differential amplifier 15. For velocity feedback control, the differential amplifier 15 calculates the difference between the velocity command voltage received from the digital to analog converter 14 and a velocity feedback voltage received from a velocity detector 20, which is described later, and supplies the differential voltage to a drive circuit 16. The drive circuit 16 is connected to drive a d.c. servomotor 17 whose output shaft is connected to a feed screw shaft 18 in threaded engagement with a movable member 19 carrying a tool T. Since the drive circuit 16 is capable of controlling the rotational speed of the servomotor 17 to decrease the differential voltage output from the differential amplifier 15 to zero, the servomotor 17 is rotated at a velocity corresponding to the velocity command voltage output from the digital to analog converter 14, whereby the movable member 19 is normally displaced at a commanded feed rate. The velocity detector 20 is connected to the feed screw shaft 18 to detect the actual feed rate (FBV) of the movable member 19, and the pulse generator 21 is also connected to the feed screw shaft 18 to generate one feedback pulse (FBP) each time the feed screw shaft 18 is rotated a predetermined angular distance.

The numerical control device 10 according to the present invention further includes an allowable feed rate register 22 connected to the operation and processing device 11 to receive an allowable feed rate data Va therefrom each time the operation and processing device 11 applies a commanded feed rate data to the register FR in the pulse generating circuit 12. An allowable feed rate is determined to be larger than a commanded feed rate by a predetermined allowable amount Da preset in a digital switch DS1 connected to the operation and processing device 11. A digital to analog converter 23 is connected to the allowable feed rate register 22 to convert an allowable feed rate data into a corresponding analog voltage which is applied to an analog comparator 24. The analog comparator 24 is also connected to the velocity detector 20 to receive a velocity feedback voltage therefrom for comparison with an analog voltage from the digital to analog converter 23. The comparator 24 is adapted to output a signal while the actual feed rate of the movable member 19 exceeds the allowable feed rate. The signal from the comparator 24 is applied as an abnormality signal to a set input terminals S of a flip flop FF. The flip flop FF is provided for memorizing the occurrence of abnormality and will be set if the actual feed rate of the movable member 19 exceeds the allowable feed rate. The flip flop FF, when set, outputs from its set output terminal Q a set signal which is thus applied as an emergency stop signal ESS to the drive circuit 16. Thus, the drive circuit 16 discontinues the rotation of the servomotor 17 in a manner of, for example, dynamic braking. A signal from the reset output terminal $\overline{Q}$ of the flip flop FF is used to turn on an abnormality indication lamp PL, thereby informing an operator of the occurrence of abnormality.

Figure 2:
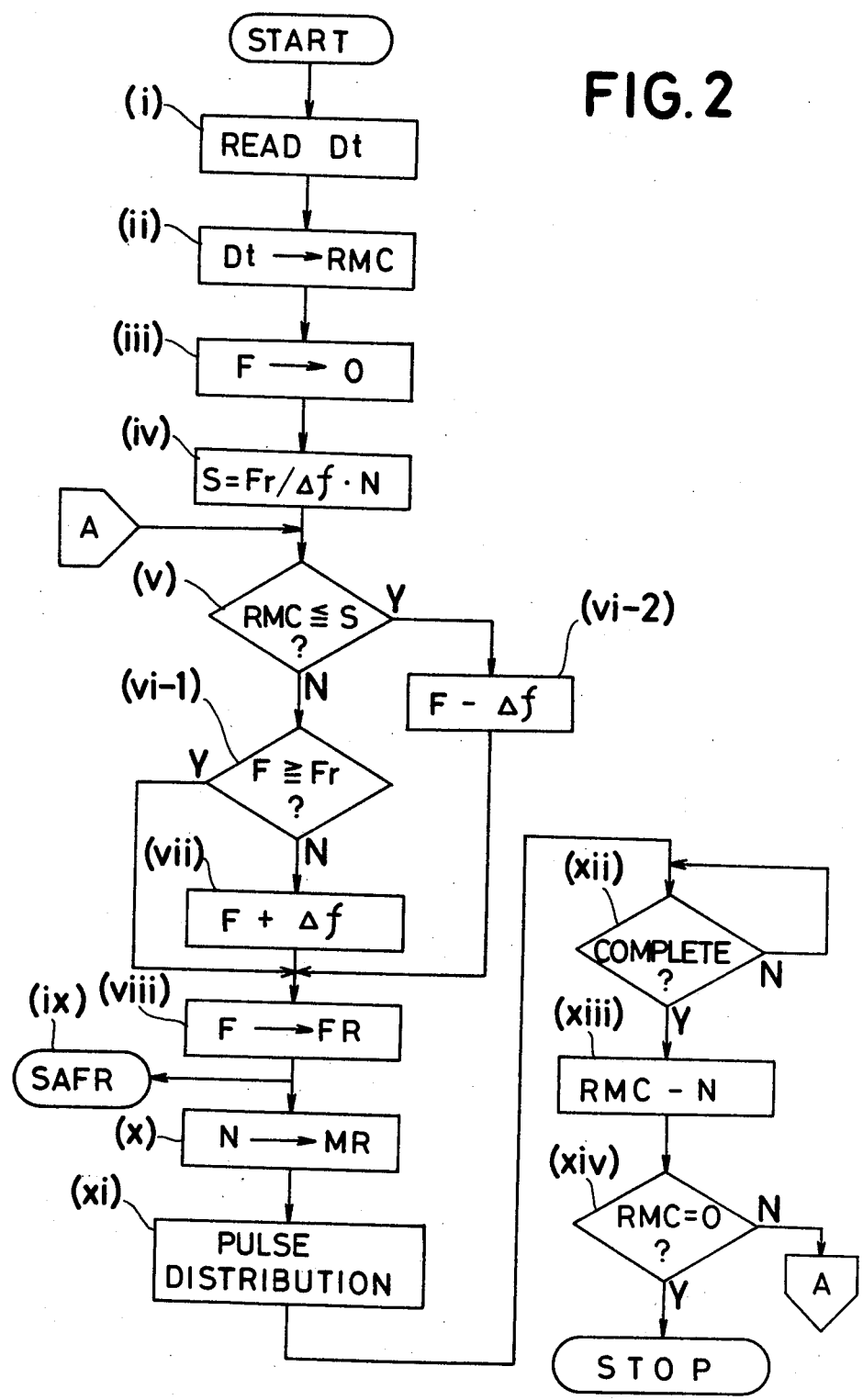
FIG. 2 is a flow chart for explaining the operation of the numerical control device.
Figure 3:
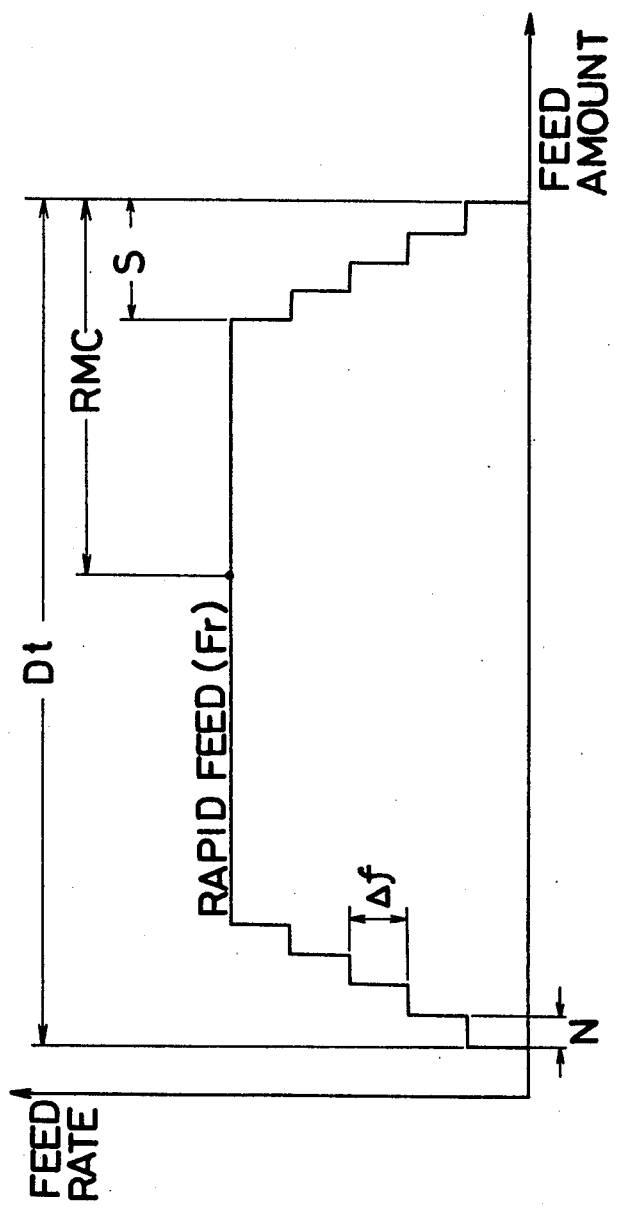
FIG. 3 is a graph showing relationship between a feed rate and a feed amount of the movable member.

The operation of the numerical control device 10 according to the present invention, for example, for moving the movable member 19 by an amount Dt at a rapid feed rate Fr will be hereunder described with reference to FIG. 2 showing a flow chart and FIG. 3 showing relationship between feed rate and feed amount of the movable member 19.

Figure 4:
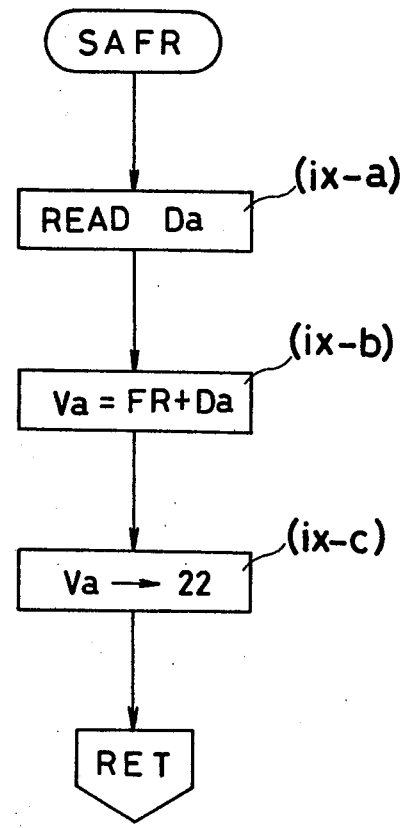
FIG. 4 is a flow chart showing the process for setting an allowable feed rate data into a register.

A step (i) in FIG. 2 involves reading total feed amount Dt from a tape read by a tape reader TR, and a step (ii) involves setting the total feed amount Dt in a register RMC, not shown, provided in the memory M for storing a remaining amount from an end point. A subsequent step (iii) involves initializing a register F in the memory M for storing a feed rate data, that is, setting the register F into zero. A next step (iv) involves calculation of a slowdown feed amount S from an equation $S = Fr/\Delta f \times N$, where Fr is a commanded feed rate, N is a movement amount of the movable member 19 when N pulses are applied, and $\Delta f$ is a unit increment of feed rate. A step (v) involves judging whether the content of the register RMC is smaller than or equal to S. At the initial stage, the content of the register RMC is larger than S, whereby the routine is advanced to a step (vi-1) wherein it is judged whether the content of the register F is larger or equal to the commanded feed rate Fr. If the content of the register RMC is smaller than or equal to S in the step (v), the routine is advanced to a step (vi-2) wherein the content of the register F is subtracted by $\Delta f$ and then advanced to a step (viii), described later. When it is ascertained in the step (Vi-1) that the content of the register F is smaller than Fr, the routine is advanced to a step (vii) wherein the content of the register F is incremented by $\Delta f$, and a step (viii) involves setting the content of the register F into the feed rate register FR in the pulse generating circuit 12. When it is ascertained in the step (vi-1) that the content of the register F is larger than or equal to Fr, the routine is advanced to the step (viii). Each time the content of the register F is set into the feed rate register FR in the step (viii), the routine SAFR for setting an allowable feed rate shown in FIG. 4 is processed. A step (ix-a) involves reading the allowable amount Da from the digital switch DS1, and a step (ix-b) involves calculation of the allowable feed rate Va from an equation $Va = FR + Da$. In step (ix-c), the allowable feed rate Va is set into the allowable feed rate register 22.

A step (x) involves setting the movement amount N into the feed amount register MR, and in a step (xi) a pulse distribution is initiated. A step (xii) involves judging whether the pulse distribution is completed. When it is ascertained in the step (xii) that the pulse distribution is completed, the routine is advanced to a step (xiii) wherein the content of the register RMC is subtracted by N. A step (xiv) involves judging whether the content of the register RMC is equal to zero. When it is ascertained in step (xiv) that the content of the register RMC is equal to zero, the routine is stopped. However, when it is ascertained in step (xiv) that the content of the register RMC is not equal to zero, the routine is returned to the step (v).

As described above, each time the content of the register F is set into the feed rate register FR in the step (viii), a corresponding allowable feed rate Va is set into the allowable feed rate register 22. Accordingly, it is possible to detect the overspeed of the movable member 19 even during the speed-up or slow-down range.

Figure 5:
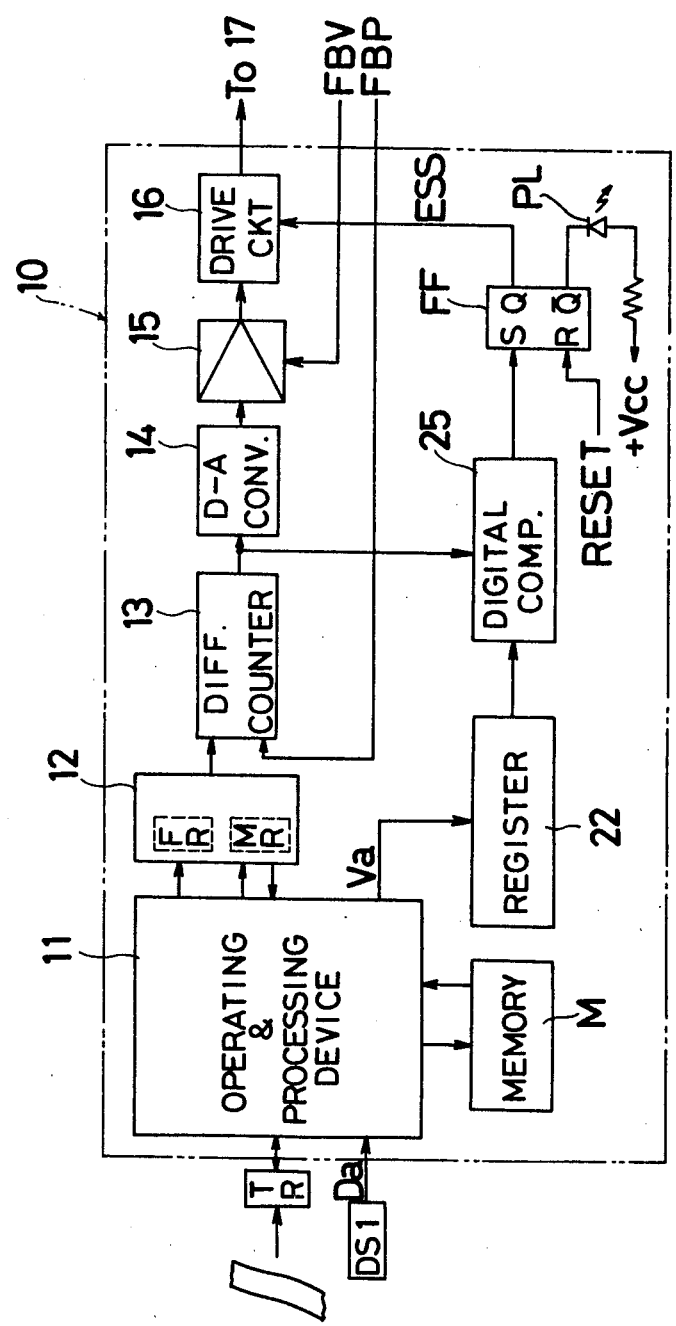
FIGS. 5 and 6 are, respectively, block diagrams of second and third embodiments of a numerical control device according to the present invention.

Referring now to FIG. 5 showing a second embodiment, the differential counter 13 is connected to a digital comparator 25 to apply the output thereto. The digital comparator 25 is also connected to the allowable feed rate register 22 to receive the allowable feed rate data therefrom. When the output from the differential counter 13 exceeds the output from the allowable feed rate register 22, the digital comparator 25 outputs a signal which is applied to the set input terminal S of the flip flop FF to set the same.

Figure 6:
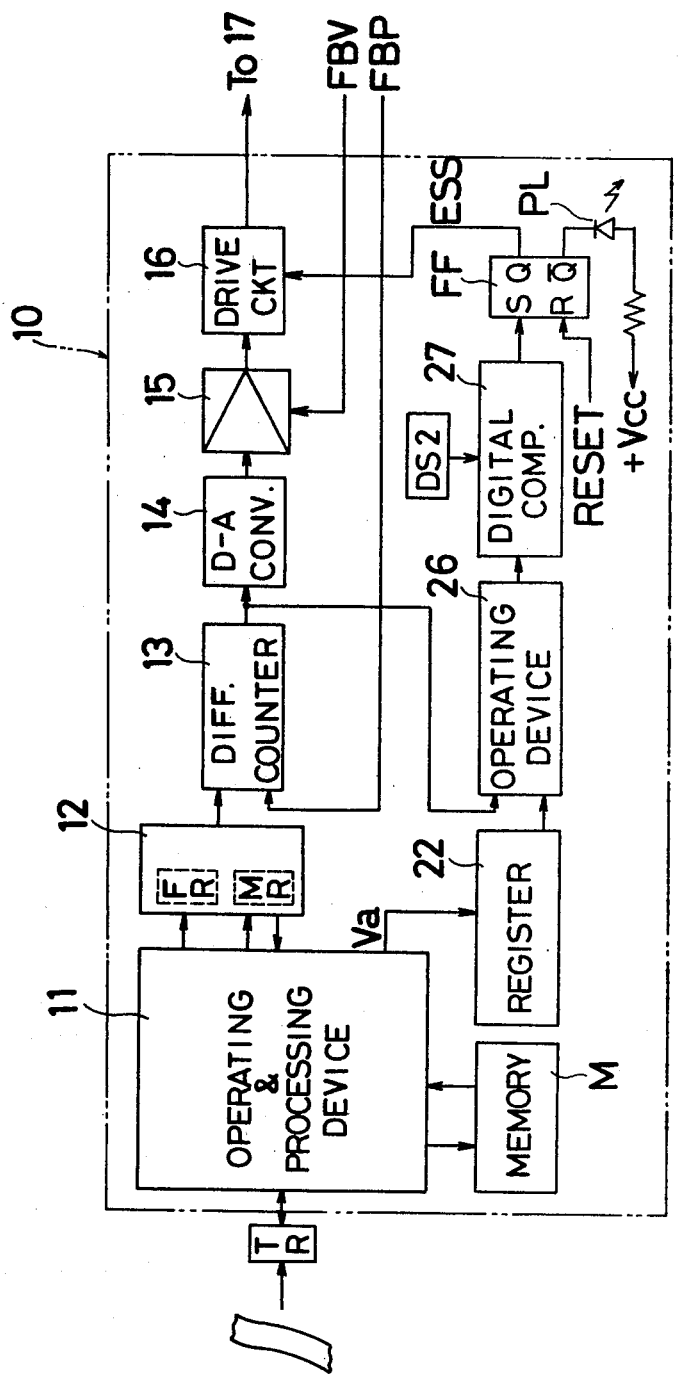

Referring to FIG. 6 showing a third embodiment, the differential counter 13 is connected to an operating device 26 to apply the output thereto. The operating device 26 is also connected to the allowable feed rate register 22 to receive the allowable feed rate data therefrom. The operating device 26 calculates the difference between the outputs from the differential counter 13 and the allowable feed rate register 22 and applies the calculated difference to a digital comparator 27. The digital comparator 27 compares the output from the operating device 26 with an allowable amount set in a digital switch DS2 and outputs a signal to set the flip flop FF, when the output from the operating device 26 exceeds the allowable amount set in the digital switch DS2. It is to be noted that in this third embodiment the digital switch DS1 is omitted and thus the allowable feed rate register 22 receives from the operating and processing device 11 a feed rate data which is set in the feed rate register FR.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. An numerical control device for controlling rotation of a servomotor connected through a feed screen shaft to a movable member in response to numerical control data to move said movable member by a commanded feed amount at a commanded feed rate, comprising:

pulse generating means responsive to data indicative of said commanded feed rate for generating a train of pulses at a frequency corresponding to said commanded feed rate;

a velocity detector for detecting an actual feed rate of said movable member so as to output actual feed rate data;

feed control circuit means connected to said servomotor and responsive to said train of said pulses and said actual feed rate data for controlling said servomotor to move said movable member at said commanded feed rate;

a register for storing reference feed rate data;

comparator means for comparing said reference feed rate data from said register with one of said actual feed rate data output from said velocity detector and data relating to said actual feed rate data so as to output an abnormal signal when a predetermined numerical relationship is established between said actual feed rate data and said reference feed rate data;

connecting means for connecting to said comparator means said one of said actual feed rate data output from said velocity detector and said data relating to said actual feed rate data; and means for setting new reference feed rate data into said register each time data indicative of a new commanded feed rate is supplied to said pulse generating means.

2. A numerical control device as set forth in claim 1, further comprising:

a feed amount detector for detecting a feed amount of said movable member so as to output feed amount data;

said pulse generating means being also responsive to data indicative of said commanded feed amount for generating said train of said pulses of a number corresponding to said commanded feed amount at a frequency corresponding to said commanded feed rate; and said feed control circuit means being also responsive to said feed amount data from said feed amount detector for controlling said servomotor to move said movable member by said commanded feed amount.

3. A numerical control device as set forth in claim 2, wherein:

said feed control circuit means includes a differential counter connected to said pulse generating means and said feed amount detector and responsive to said train of said pulses and said feed amount data for calculating a difference between the number of said pulses supplied thereto and said feed amount data, said difference representing said data relating to said actual feed rate data; and said connecting means comprises a line connecting one of said velocity detector and said differential counter to said comparator means for applying to said comparator means one of said actual feed rate data and said data relating to said actual feed rate data.

4. A numerical control device as set forth in claim 3, wherein:

said line connects said velocity detector to said comparator means for supplying said actual feed rate data to said comparator means.

5. A numerical control device as set forth in claim 4, wherein said means for setting said new reference feed rate data comprises:

an operation and processing device connected to said pulse generating means and said register for supplying said data indicative of said commanded feed rate and said data indicative of said commanded feed amount to said pulse generating means and for supplying allowable feed rate data as said new reference feed rate data to said register each time of supplying said data indicative of said commanded feed rate to said pulse generating means, said allowable feed rate data being larger in value than said actual feed rate data output from said velocity detector when said movable member is moved at said commanded feed rate;

said comparator means being adapted to output said abnormal signal when a value of said actual feed rate data from said velocity detector exceeds a value of said allowable feed rate data.

6. A numerical control device as set forth in claim 5, wherein said feed control circuit means further includes:

a digital-to-analog converter for converting said difference supplied from said differential counter into a corresponding analog signal;

a differential amplifier for calculating an amplified difference between said corresponding analog signal and said actual feed rate data respectively supplied from said digital-to-analog converter and said velocity detector; and a drive circuit for controlling rotation of said servomotor in response to said amplified difference from said differential amplifier and for discontinuing said rotation of said servomotor in response to said abnormal signal from said comparator means.

7. A numerical control device as set forth in claim 6, wherein said comparator means comprises:

a data converter for converting one of said actual feed rate data and said allowable feed rate data respectively supplied from said velocity detector and said register into a corresponding value of the same kind as that of the other of said actual feed rate data and said allowable feed rate data; and a comparator for comparing said one of said actual feed rate data and said allowable feed rate data converted into said corresponding value with said the other of said actual feed rate data and said allowable feed rate data.

8. A numerical control device as set forth in claim 3, wherein:

said line connects said differential counter to said comparator means for supplying said data relating to said actual feed rate data to said comparator means.

9. A numerical control device as set forth in claim 8, wherein:

said means for setting said new reference feed rate data comprises an operation and processing device connected to said pulse generating means and said register for supplying said data indicative of said commanded feed rate and said data indicative of said commanded feed amount to said pulse generating means and for supplying allowable feed rate data as said new reference feed rate data to said register each time of supplying said data indicative of said commanded feed rate data to said pulse generating means, said allowable feed rate data being larger in value than said data relating to said actual feed rate data supplied from said differential counter when said movable member is moved at said commanded feed rate; and said comparator means comprises a digital comparator adapted to output said abnormal signal when a value of said data relating to said actual feed data from said differential counter exceeds a value of said allowable feed rate data.

10. A numerical control device as set forth in claim 9, wherein said feed control circuit means further includes:
  a digital-to-analog converter for converting said difference supplied from said differential counter into a corresponding analog signal;
  a differential amplifier for calculating an amplified difference between said corresponding analog signal and said actual feed rate data respectively supplied from said digital-to-analog converter and said velocity detector; and
  a drive circuit for controlling rotation of said servomotor in response to said amplified difference from said differential amplifier and for discounting said rotation of said servomotor in response to said abnormal signal from said digital comparator.

11. A numerical control device as set forth in claim 8, wherein said means for setting said new reference feed rate data comprises:
  an operation and processing device connected to said pulse generating means and said register for supplying said data indicative of said commanded feed rate and said data indicative of said commanded feed amount to said pulse generating means and for supplying said reference feed rate data to said register each time of supplying of said data indicative of said commanded feed rate data to said pulse generating means, said reference feed rate data corresponding in value to said data relating to said actual feed rate data supplied from said differential counter when said movable member is moved at said commanded feed rate.

12. A numerical control device as set forth in claim 11, wherein said comparator means comprises:
  a subtraction circuit for calculating a difference between said data relating to said actual feed rate data and said reference feed rate data respectively supplied from said differential counter and said register; and
  a digital comparator responsive to said difference supplied from said subtraction circuit for outputting said abnormal signal when said difference exceeds a preset value supplied thereto.

13. A numerical control device as set forth in claim 12, wherein said feed control means further includes:
  a digital-to-analog converter for converting said difference supplied from said differential counter into a corresponding analog signal;
  a differential amplifier for calculating an amplified difference between said corresponding analog signal and said actual feed rate data respectively supplied from said digital-to-analog converter and said velocity detector; and
  a drive circuit for controlling rotation of said servomotor in response to said amplified difference from said differential amplifier and for discontinuing said rotation of said servomotor in response to said abnormal signal from said digital comparator.

* * * * *